United States Patent [19]

Graber

[11] Patent Number: 4,645,128
[45] Date of Patent: Feb. 24, 1987

[54] APPARATUS FOR SPRAYING PLANT-PROTECTIVE AGENTS

[75] Inventor: Alfred Graber, Fischbach-Göslikon, Switzerland

[73] Assignee: Ciba-Geigy AG, Basel, Switzerland

[21] Appl. No.: 753,513

[22] Filed: Jul. 10, 1985

[30] Foreign Application Priority Data

Jul. 19, 1984 [CH] Switzerland .................. 3517/84

[51] Int. Cl.⁴ .................. B05B 3/10; A01G 25/14
[52] U.S. Cl. .................. 239/223; 239/377; 239/72; 222/175
[58] Field of Search .................. 239/148, 304–307, 239/375, 380, 226, 223, 224, 150, 377, 319, 71–73, 700–703, 159, 163, 713; 340/648, 671; 222/175

[56] References Cited

U.S. PATENT DOCUMENTS

| | | | |
|---|---|---|---|
| 1,782,309 | 11/1930 | Ludwig | 239/DIG. 14 X |
| 2,789,396 | 4/1957 | Jernander et al. | 239/154 X |
| 3,199,786 | 8/1965 | Waldrum | 239/223 |
| 3,976,087 | 8/1976 | Bolton et al. | 239/148 X |
| 4,262,288 | 4/1981 | Lanphier et al. | 340/671 X |
| 4,275,838 | 6/1981 | Fangmeyer | 239/223 |
| 4,362,275 | 12/1982 | Coffee | 239/700 |

FOREIGN PATENT DOCUMENTS

| | | | |
|---|---|---|---|
| 2362673 | 3/1978 | France . | |
| 851714 | 10/1960 | United Kingdom | 239/163 |
| 2092478 | 8/1982 | United Kingdom | 239/700 |
| 2131327 | 6/1984 | United Kingdom | 239/224 |

Primary Examiner—Joseph F. Peters, Jr.
Assistant Examiner—Kevin Patrick Weldon
Attorney, Agent, or Firm—Harry Falber

[57] ABSTRACT

An apparatus for spraying plant-protective agents comprises a spray head having a motor, a spray plate mounted on the driving shaft of the former and a first container which is fastened to a lance. The container is connected via a connecting pipe line with a nozzle in the vicinity of the center of the spray plate. Diametrically opposite the mouth of the connecting pipe line in the container, a supply hose is connected with the first container which hose connects the latter container with a portable second container. Thereby, the relatively small first container can be refilled from the substantially larger second container. A large area can, therefore, be sprayed without having to handle the plant-protective agent. This reduces the danger of coming into contact with the plant-protecting agent. The apparatus is particularly suitable for the spraying of insecticides and fungicides.

16 Claims, 5 Drawing Figures

APPARATUS FOR SPRAYING PLANT-PROTECTIVE AGENTS

BACKGROUND OF THE INVENTION

This invention relates to an apparatus for the spraying of plant-protective agents, in particular of insecticides and fungicides, comprising a lance or rod; a spray head comprising a motor, a driving shaft thereof, a spray plate connected with said shaft, and a first container; and a connecting pipe line associated with the spray head and having a discharge opening near the center of the spray plate.

A known spraying apparatus of this kind contains in the lance batteries for driving the motor. The filling capacity of the container must be kept relatively small as, otherwise, the spray head will become too heavy to handle. This causes the need for frequent refilling in the field through a relatively narrow feed opening. The handling of the sprayhead is, therefore, rather difficult, so that there is great danger that the user will come into contact with the liquid to be sprayed. This is very dangerous in the case of many insecticides.

OBJECTS AND SUMMARY OF THE INVENTION

It is an object of the invention to solve the task of eliminating the above-mentioned drawback of the known spraying apparatus. This object is attained, in accordance with the invention, by providing a second container which is connected with the first container of the initially described apparatus by means of a supply line which is flexible throughout at least a part of its length, and by providing the second container with a filling aperture for an insecticide or the like plant-protective agent.

This permits refilling of the first container in the field by way of the supply line without opening of the closure lid, so that a large area can be sprayed without danger. As the second container is substantially larger than the first one can be made, without making difficult the handling of the entire apparatus, the second container can be provided with a large filling aperture whereby the refilling, less frequently required anyway, will be substantially less risky to the user.

When the second container is devised to be portable, it will be suitably carried on the user's back. In spite of the essentially larger filling capacity the apparatus will be just as handy to operate as the known device mentioned hereinbefore.

BRIEF DESCRIPTION OF THE DRAWINGS

Further objects and advantages of the spraying apparatus according to the invention will become apparent from a more detailed description of a preferred embodiment thereof in connection with the accompanying drawings in which.

DETAILED DESCRIPTION OF THE EMBODIMENTS SHOWN IN THE DRAWINGS

Figure 1:
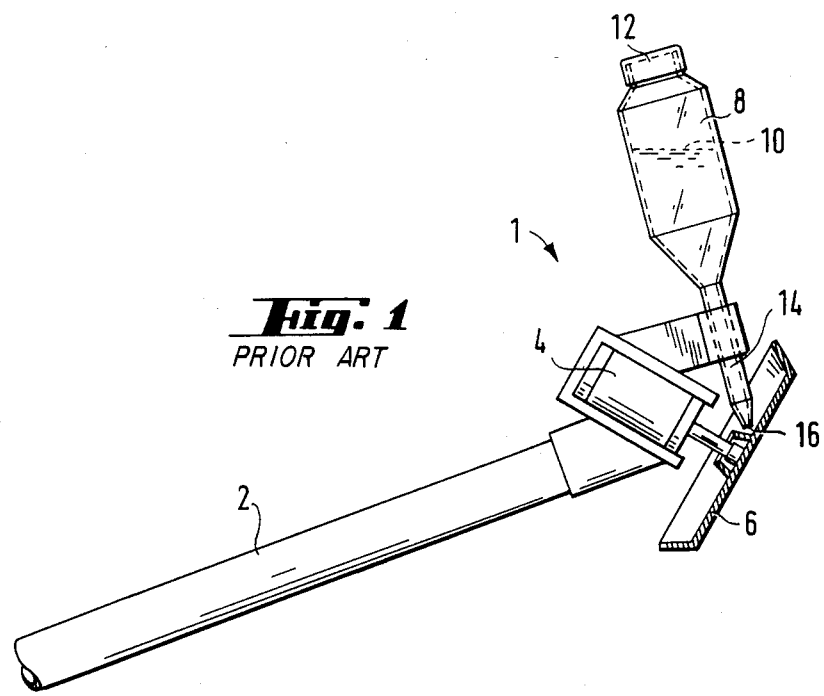
FIG. 1 shows schematically a known spraying apparatus in operating position.
Figure 2:
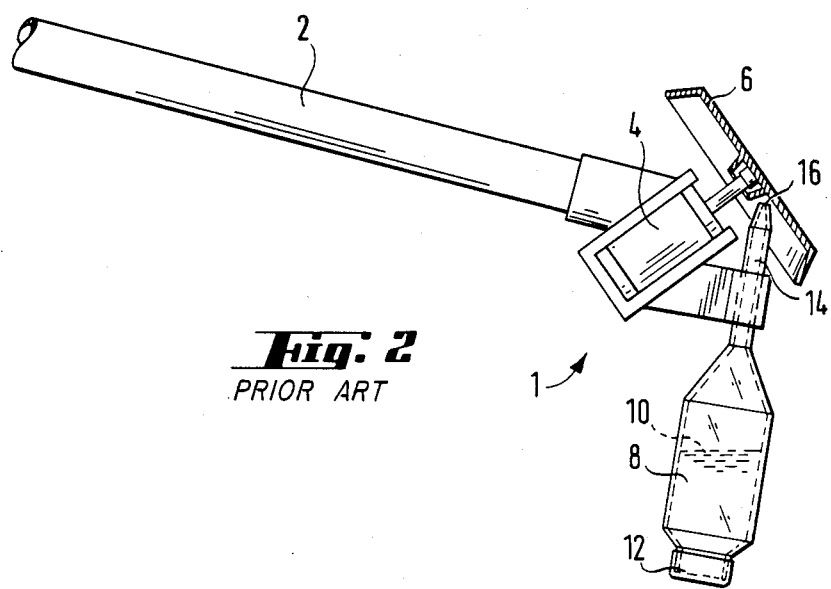
FIG. 2 shows the same known apparatus in turned-off condition.

The known spraying apparatus shown in FIGS. 1 and 2 comprises a lance or rod 2 at the front end of which there is fastened a spray head 1, and which contains batteries for driving a motor 4 with whose driving shaft there is connected a spray plate 6. A liquid container 8 having a tight fill-in lid 12 is attached to the casing of the motor. In the operating position shown in FIG. 1, a liquid 10 flows out of the container 8 via a conduit 14 and a nozzle 16 to the vicinity of the center of the spray plate 6. Owing to the fast rotation of the spray plate 6 the liquid is atomized. In the turned-off position (FIG. 2), the lance has been turned about its axis by 180°, so that no liquid 10 will flow anymore out of the conduit 14.

The filling capacity of the container 8 must be kept relatively small because, otherwise, the spray head will become so heavy as to be unwieldy. This requires a frequent filling-up in the field through the relatively small filling aperture. Handling of the spray head in doing so is rather difficult, so that there is great danger of the user coming into contact with the liquid 10. In the case of many insecticides, this is highly dangerous.

Figure 3:
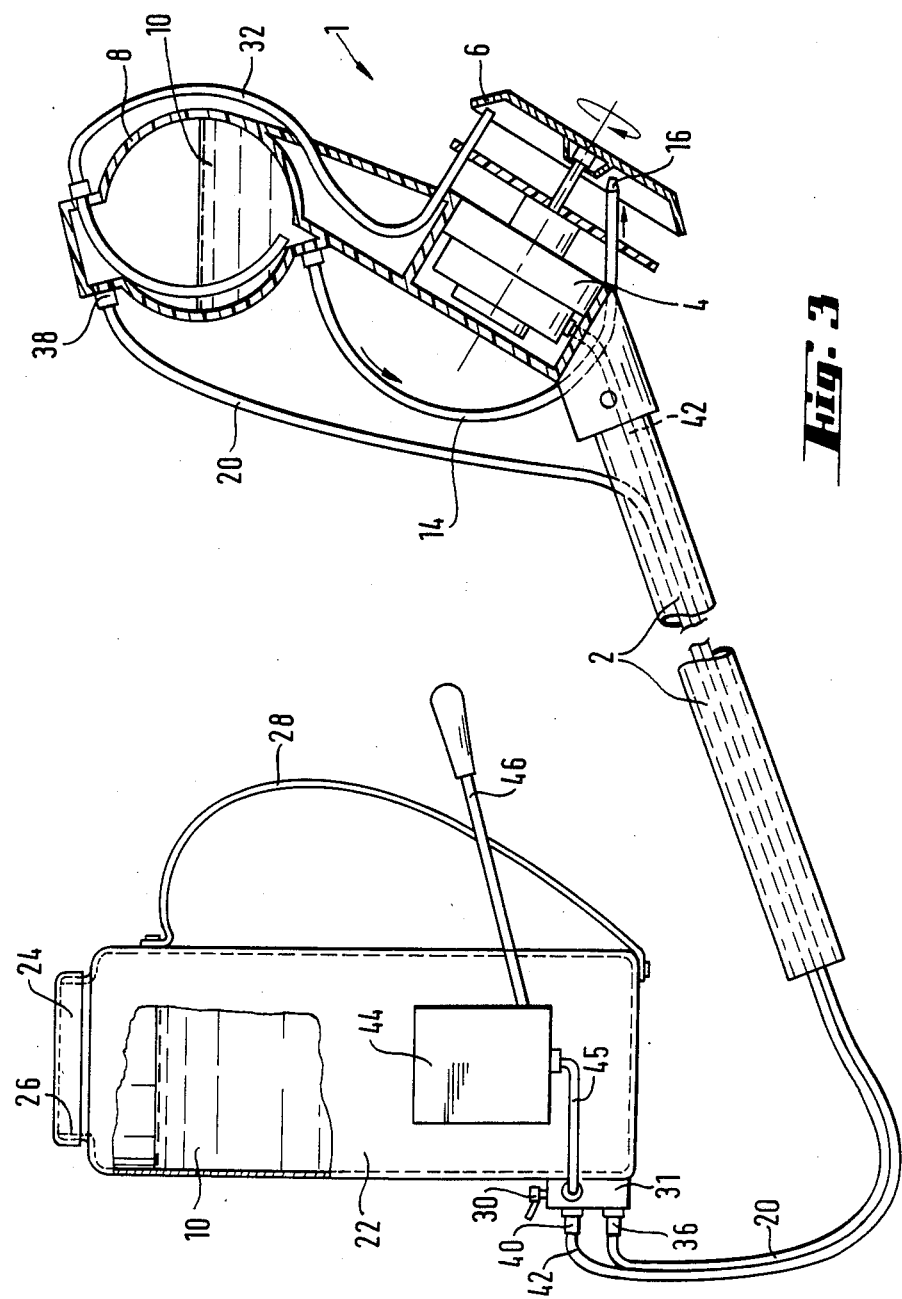
FIG. 3 shows schematically a preferred embodiment of the spraying apparatus according to the invention with the parts in operating position.
Figure 4:
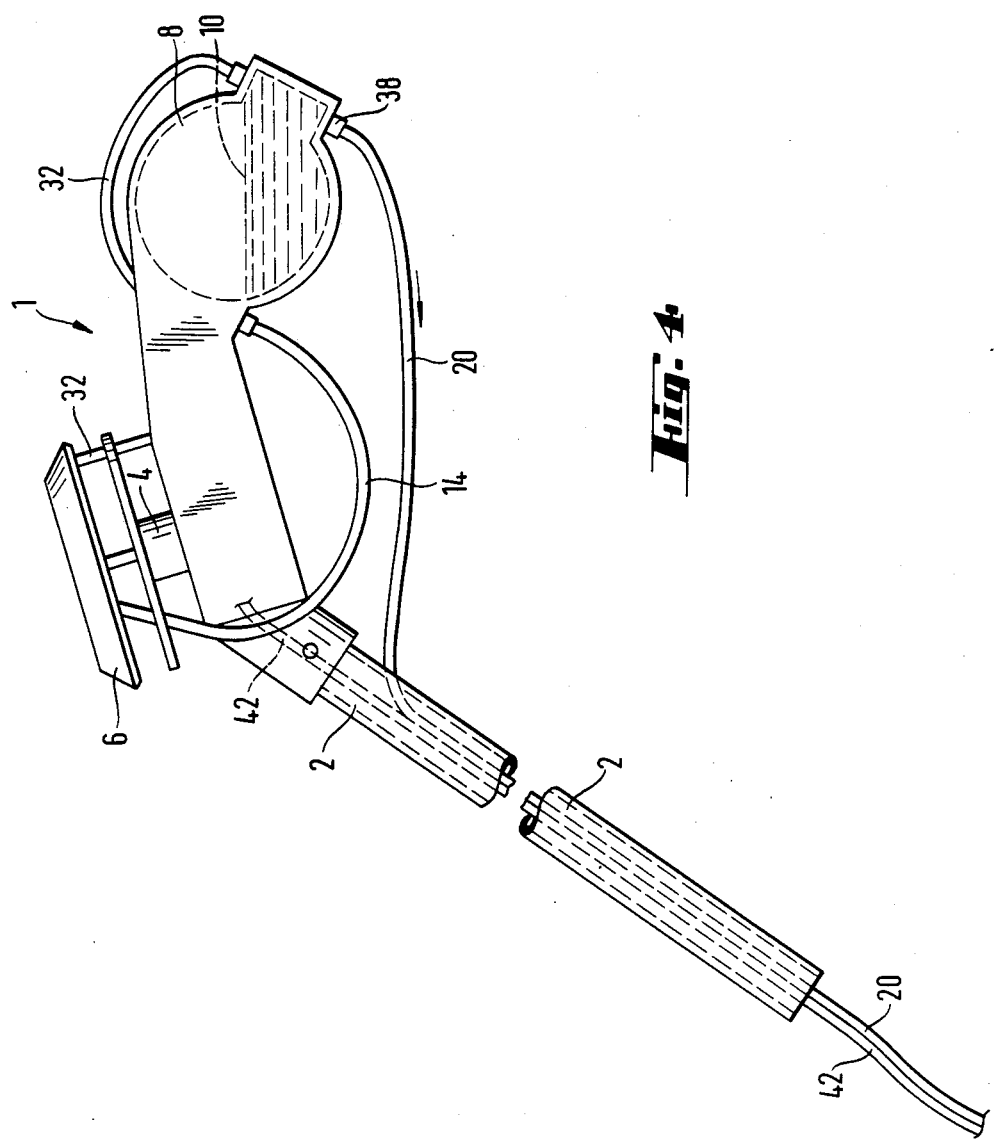
FIG. 4 shows the same embodiment as in FIG. 3, with the parts in turned-off position.
Figure 5:
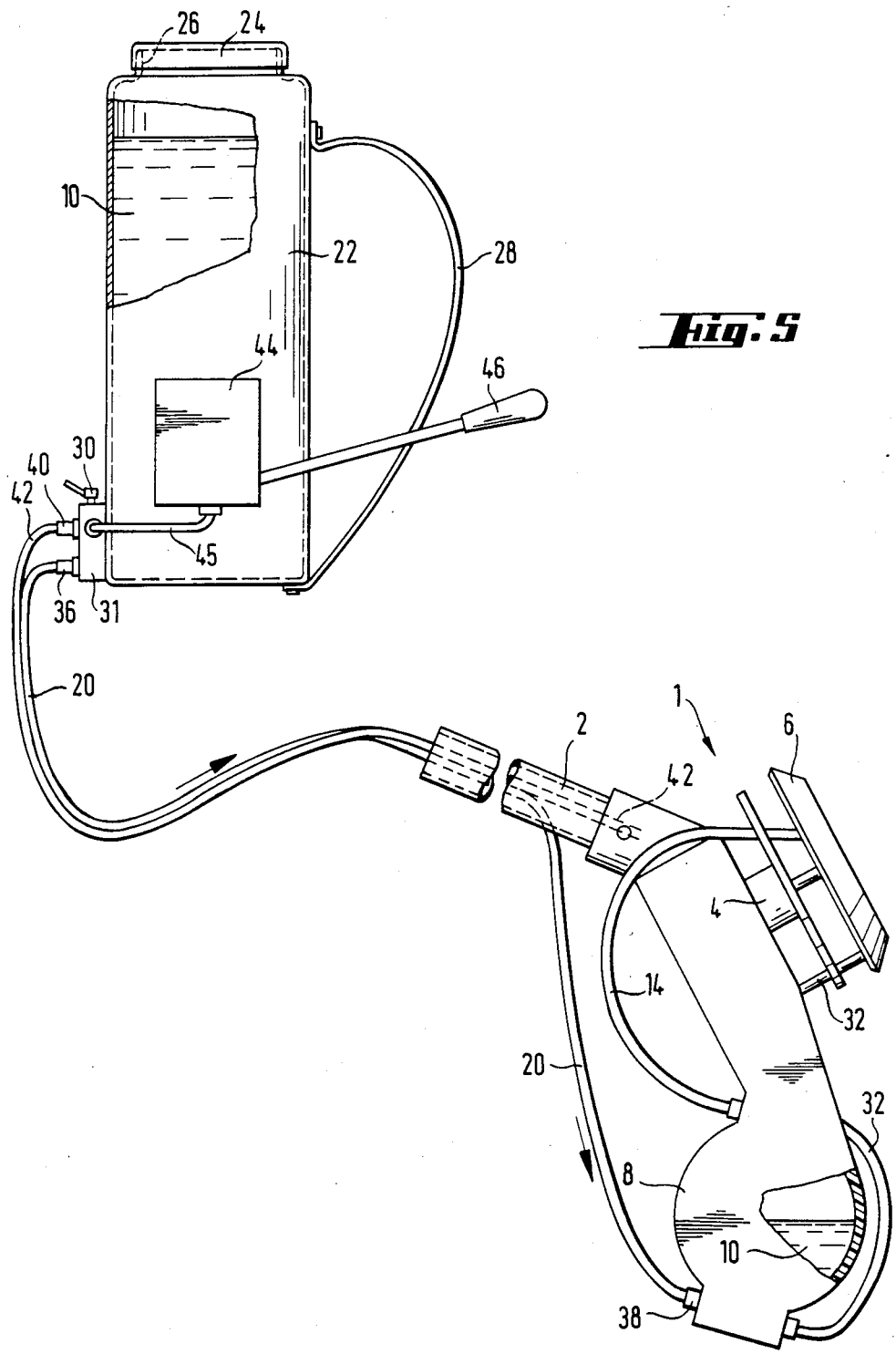
FIG. 5 shows the same apparatus in re-filling position.

The new apparatus according to the invention, as shown in FIGS. 3 to 5, comprises a lance 2 to the foreward end of which a spray-head 1 is detachably fastened. The sprayhead 1 comprises an air turbine 4 and a spray plate 6 fastened on the driving shaft of the former. On the housing of the turbine there is mounted a closed, transparent first container 8 to be filled with an insecticide or the like plant-protective agent 10.

From the container 8, a connecting pipe line 14 leads to a nozzle 16 in the vicinity of the center of the spray plate 6. A vent hose 32 moreover connects the interior of the container with the spray plate 6. The vent hose 32 extends in the container interior up to the region of the joint of the connecting pipe line 14 so that the feed level which determines the amount flowing through the connecting pipe line 14 is independent of the prevailing filling level of the container 8. Droplets which may be formed at the mouth of the vent hose 32 will be atomized by the spray plate 6.

Diametrically opposite the connecting socket of the connecting pipe line 14 on the container 8, a connecting hose 20 is connected with the container by means of a plug-in coupling 38, which hose 20 is fastened to the lance 2. The other end of the hose 20 is connected with a storage container 22 by means of a plug-in coupling 36. In the connecting element 31 for the plug-in coupling 36 there is disposed a check valve 30. The container 22 has a filling aperture 26 of large dimension, which is tightly closed by a lid 24. Two carrying straps 28 permit the container 22 to be carried on the back of an operator. The turbine 4 will emit an acoustic signal, when its speed drops below a minimum limit. An air pump 44 having a manually actuated lever 46 is attached to the container 22. The compressed air outlet 45 of the pump 44 is connected with a turbine 4 by means of the connecting element 31, a detachable coupling 40, a connecting hose 42 and the hollow lance 2. An electric motor can be provided in lieu of the turbine 4.

In certain kinds of application, it is suitable for the lance to be rotatable about its axis and to be detachably fastened to the container 22 so as to be slewable upward and downward in a plane extending perpendicular relative to the ground.

In order to render the apparatus operative, the spray head 1 is first mounted on the lance, and the coupling 38 is connected with the container 8. The container 22 is then filled with insecticide or the like plant protective agent, and closed. After the container 22 has become suspended on the user's back, the couplings 36 and 40 are plugged in. In the field the lance is then brought into its filling position (FIG. 5) and the check valve 30 is opened. Insecticide will then flow from the container 22 into the container 8. When the container 8 has been filled, the check valve 30 is closed. In order to discharge a spray of the insecticide, the turbine 4 is set in motion, and the lance 2 is shifted to working position (FIG. 3). The insecticide will then flow out of the container 8 and through the connecting pipe line 14 and the nozzle 16 on to the rotating spray plate 6 which atomizes the liquid. In the case of interruptions, the lance 2 is turned by 180° about its axis to adopt the turned-off position (FIG. 4) and the turbine is switched off. In order to continue the operation, the turbine 4 is turned on and the lance 2 is turned again by 180° into the working position (FIG. 3). After the work has been terminated, the lance is held in turned-off position (FIG. 4) and the check valve 30 is opened. The residual liquid from the container 8 can then flow back into the container 22. After closing the valve 30 and uncoupling the hose 20 from the container 22, the apparatus can be rinsed.

The entire spraying job can be carried out without coming into contact with the insecticide. For example, a filling capacity of 5 liters of the container will suffice to spray an area of from 2 to 5 hectares. Even when the areas to be treated are larger, this will cause no problem on account of the large filling aperture 26 and the relatively secure position of the container 22 on the ground.

I claim:

1. A portable apparatus for spraying plant-protective agents, comprising a hand-held lance or rod, a spray head comprising a motor, a driving shaft thereof, a rotatable spray plate connected with said shaft, and a first container, and a connecting pipe line associated with said spray head and having a discharge opening near the centre of said spray plate, a portable second container with a filling aperture for the plant-protective agent, and a supply line having a longitudinal axis and being flexible and rotatable about its longitudinal axis in at least a part of its length and connecting said second container with said first container; said supply line and said connecting line opening into said first container through orifices located at least approximately diametrically opposite one another; said first container is mounted on said lance or rod adjacent the spray head, said lance or rod having a longitudinal axis about which a lance and the first container are rotatable, the lance and the first container are connected to said second container in a manner so as to be slewable upward and downward in a vertical plane.

2. The apparatus of claim 1, wherein said spray head further comprises a vent line having one end thereof connected with said first container and extending inside said first container to the vicinity of where said connecting pipe line is joined to said first container, the other end of said vent line being directed against said spray plate.

3. The apparatus of claim 1, wherein said supply line is detachably connected at least with said second container, and wherein said supply line comprises a check valve located at the junction between said supply line and said second container.

4. The apparatus of claim 1, wherein said motor is an air turbine comprising an air feed line extending through the interior of said lance or rod.

5. The apparatus of claim 1, wherein said motor is an electric motor.

6. The apparatus of claim 1, wherein said motor comprises a warning device adapted for emitting during operation, a signal whenever the speed of said motor drops below a determined limit.

7. The apparatus of claim 5, wherein said lance is connected detachably with said second container.

8. The apparatus of claim 2, wherein said supply line is detachably connected at least with said second container, and wherein said supply line comprises a check valve located at the junction between said supply line and said second container.

9. The apparatus of claim 3, wherein said motor is an air turbine comprising an air feed line extending through the interior of said lance or rod and is connected to a manually activatable air pump.

10. The apparatus of claim 3, wherein said motor comprises a warning device adapted for emitting, during operation, a signal whenever the speed of said motor drops below a determined limit.

11. The apparatus of claim 4, wherein said air feed line is connected to a manually activatable air pump.

12. A portable apparatus for spraying plant-protective agents, comprising a hand-held lance or rod, a spray head comprising a motor, a driving shaft thereof, a rotatable spray plate connected with said shaft, and a first container; and a connecting pipe line associated with said spray head and having a discharge opening near the center of said spray plate; a second portable container with a filling aperture for the plant-protective agent, and a supply line having a longitudinal axis and being flexible and rotatable about its longitudinal axis in at least a part of its length and connecting said second container with said first container;

said supply line and said connecting line opening into said first container through orifices located at least approximately diametrically opposite one another; said first container is mounted on said lance or rod adjacent the spray head, said lance or rod having a longitudinal axis about which said lance and the first container are rotatable, the lance and the first container are connected to said second container in a manner so as to be slewable upward and downward in a vertical plane;

said spray head further comprising a vent line having one end thereof connected with said first container and extending inside said first container to the vicinity of where said connecting pipe line is joined to said first container, the other end of said vent line being directed against said spray plate;

wherein said supply line is detachably connected at least with said second container, and wherein said supply line comprises a check valve located at the junction between said supply line and said second container.

13. The apparatus of claim 12, wherein said motor is an air turbine comprising an air feed line extending through the interior of said lance or rod.

14. The apparatus of claim 12, wherein said motor is an electric motor.

15. The apparatus of claim 12, wherein said motor comprises a warning device adapted for emitting, during operation, a signal whenever the speed of said motor drops below a determined limit.

16. The apparatus of claim 13, wherein said air feed line is connected to a manually activatable air pump.

* * * * *